Sept. 19, 1939.  H. F. JORDAN  2,173,256
METHOD AND APPARATUS FOR FILTERING
Filed Oct. 1, 1938
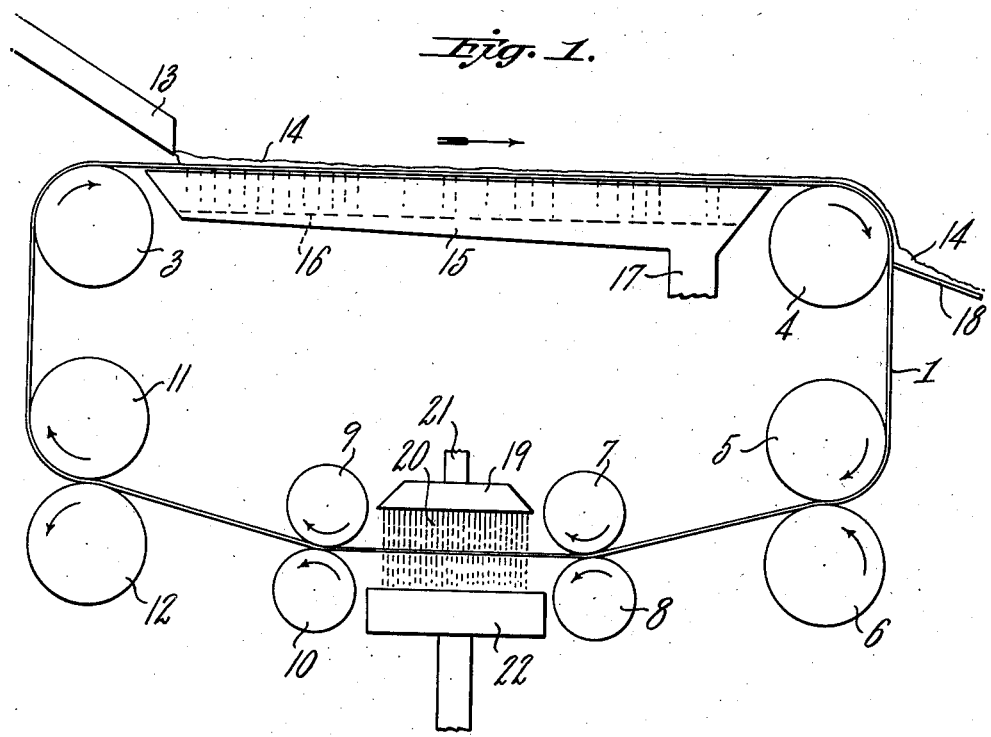
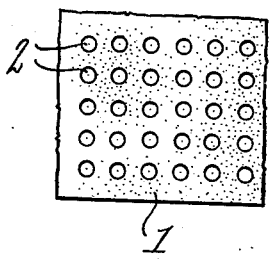
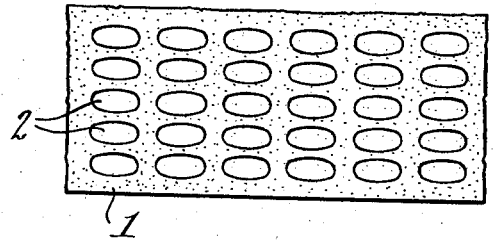
INVENTOR.
HUBERT F. JORDAN
BY Gourley + Budlong
ATTORNEYS

UNITED STATES PATENT OFFICE 2,173,256

METHOD AND APPARATUS FOR FILTERING

Hubert F. Jordan, Nutley, N. J., assignor, by mesne assignments, to United States Rubber Company, New York, N. Y., a corporation of New Jersey Application October 1, 1938, Serial No. 232,770

5 Claims. (Cl. 210—198)

This invention relates to methods and apparatus for filtering solid material suspended or dispersed in a liquid medium, and more particularly to rendering the apparatus after one filtering operation in condition for repeating the filtering operation efficiently.

According to the present invention, material suspended or dispersed in a liquid medium is filtered through successive portions of a traveling elastic perforate filtering member. The portions of the filtering member which have performed the filtering operation are then successively subjected to a cleaning step in the process, after which they are returned to their original state of efficiency for repeating the filtering stage in the process.

It has previously been proposed to provide a so-called "self-cleaning" perforate rubber filter sheet as the filtering medium in conjunction with a conventional rotary filter drum in which successive areas of the filter sheet are alternately subjected to vacuum and pressure. According to such previous suggestion, vacuum is applied within the drum while a filter cake is retained on the exterior of the filter medium, and after removal of the filter cake from the exterior of the drum, air pressure is applied from the interior of the drum to stretch portions of the rubber outwardly from the drum into semi-cylindrical sections and simultaneously to blow clogging material out of the perforations. The degree of stretch imparted to limited areas of the perforate rubber by this method is necessarily limited due to the fact that as soon as some of the perforations have become unclogged, a major portion of the air passes in unobstructed flow through the open holes, thereby considerably reducing the pressure from within the drum which is relied upon to produce the stretch. The result is that a considerable proportion of the perforations do not become cleaned or unclogged. Since the degree of stretch is limited, the effective enlargement of the perforations in the filter sheet to loosen all the material entrapped in the holes cannot be efficiently produced or maintained by such previous means.

The present invention provides for controlled enlargement of the perforations during the washing of a perforate elastic filtering medium by mechanically stretching the medium to the desired degree. The above disadvantages are entirely obviated since the degree of stretch imparted to the filter medium depends upon independent mechanical stretching means which open up all the pores or perforations in the stretchable filter medium sufficiently to loosen entrained material and to permit the flow of the desired quantity of cleaning fluid through all the perforations, each of which is enlarged to the desired degree and is limited only by the elastic limit of the filter medium. Another obvious advantage of the invention lies in the fact that the rubber or other elastic perforate medium is stretched in a generally planar direction, so that cleaning fluid directed through it passes through all the perforations at the same angle, and consequently with similar pressure.

In practicing the invention, solid material suspended in a liquid is deposited onto the surface of a travelling elastic perforate filtering member. Part or all of the suspension medium or filtrate liquid is withdrawn from the liquid suspension through the filtering member, and the filtered material remaining after removal of the liquid therefrom is removed from the travelling surface upon which it is deposited. Successive portions of the filtering medium which have just completed the desired filtering operation are then stretched mechanically longitudinally or laterally, or both, as desired, so as to enlarge the perforations therein and thereby to facilitate cleaning. While successive portions of the travelling filtering medium are still in their stretched condition, they are subjected to a cleaning step which may comprise introducing a fluid onto the surface thereof and passing it through the enlarged perforations therein. When a portion of the travelling filtering member has been cleaned in its stretched condition, it is then relaxed to the desired degree and as such is in condition for a repetition of the filtering step.

The accompanying drawing illustrates a present preferred embodiment of the invention in which:

Fig. 1 is a diagrammatic side elevational view of a filtering apparatus.

Fig. 2 is a greatly enlarged plan view of a portion of the filtering member in condition for filtering; and Fig. 3 is an enlarged plan view of the same portion of the filtering member in condition for cleaning.

In a preferred embodiment, the present invention may be practiced by employing a continuous endless perforate elastic belt as a filtering medium or septum, which is actuated to travel in a cycle so that a portion of the belt successively functions as a deposition surface for material to be filtered, as a medium for separating the suspension liquid from the material, and as a surface to hold the filtered material remaining after filtration and from which the filtered material may be removed. After each portion of the belt has completed these stages in the cycle of operation, a considerable amount of filtrate, solid material, and slurry may remain on the surface and in the perforations thereof, thus clogging the belt and rendering it extremely inefficient for immediate reuse in that condition upon completion of the entire cycle. In order to recondition the belt for efficient subsequent repetition of the filtering stage, it is mechanically stretched in any desired manner, as by passing it between pinch rolls whose surface speed is greater than the surface speed of the belt as it progresses through the filtering operation. The stretch thereby initially imparted may be maintained in a similar manner, during which stage in the cycle the pores or perforations in the belt are enlarged to admit cleaning fluid and to release the pressure tending to hold foreign particles or slurry therein.

A washing liquid may be poured or sprayed or otherwise forced through the stretched portion of the belt, to clean it, or compressed air may be blown through. If desired, tentering frames may be arranged along either side of the portion of the belt which is to be cleaned to stretch it laterally, which procedure may at times be preferable because with some materials the pressure applied by the pinch rolls referred to above may have the effect of compacting the foreign material in the perforations. It may be desirable, in some instances, to employ means for stretching successive portions of the belt both in the longitudinal and in the transverse direction, which can be suitably accomplished by the use both of pinch rolls and tentering frames.

The invention is not limited to a cyclic process resulting from propulsion of an endless perforate elastic filtering medium through the successive stages of operations, but contemplates the application of other forms of travelling filtering members in which the process need not be immediately repeated upon completion. In accordance with such method of practicing the invention, apparatus may be provided in which the filtering member is continuously unrolled from a feeding reel, passes through the filtering and cleaning stages, and is finally rolled up again in relaxed condition onto a suitable receiving mechanism. It may then be stored ready for a repetition of the process at any time as by substituting the receiving reel in the same position where the feeding reel was originally placed.

Referring particularly to Fig. 1 of the drawing, the extensible filtering medium comprises an endless perforate elastic member or belt 1 which preferably is made of vulcanized rubber. The belt is provided with perforations 2, shown greatly enlarged in Fig. 2, which may be of any desired size and arrangement commensurate with the size of the solid particles or bodies which are to be separated from the liquid medium in which they are carried or suspended. For example, if the belt 1 is to filter a suspension of finely divided material, the perforate rubber sheet material described in U. S. Letters Patent 2,032,941 may be advantageously employed. This material may have from 1,000 to 10,000 perforations per square inch, ranging from 0.01 to 0.2 mm. in diameter. When utilizing the apparatus with other sheet materials, different sizes and arrangement of perforations may be desired, as when filtering or dividing coarser material, or when the viscosity of the filtrate is greater. The endless belt in its cycle of travel is driven by synchronized upper driving rolls 3 and 4 so that a point on the belt travels horizontally between the rolls in the direction of the arrow. After leaving the driving roller 4, which together with or independently of the roller 3, may be rotated by any suitable driving means not shown, the filtering belt 1 passes between a pair of nip rolls 5 and 6, the surface speeds of which are the same as those of the rollers 3 and 4. From between the nip rolls 5 and 6 the belt is drawn between successive pairs of pinch or stretch rolls 7, 8 and 9, 10 respectively. The surface speeds of the stretching rolls 7, 8, 9 and 10 are preferably equal to each other, but greater than that of the nip rolls 5 and 6. From the stretch rolls 9 and 10, a point or portion of the belt 1 travels between a second pair of nip rolls 11 and 12 and back over the driving roll 3 to commence a new cycle. The nip rolls 11 and 12 preferably have the same surface speed as the rolls 3, 4, 5 and 6.

A chute 13 is positioned above the horizontal portion of the belt between the driving rolls 3 and 4 to introduce material 14 to be filtered onto the upper surface of the belt 1. Below the upper horizontal section of the belt, a trough 15 or other suitable liquid receiving means catches the filtrate 16 as it passes through the perforations 2 of belt 1. If desired, suction means may be associated with the trough 15 to assist withdrawal of the filtrate 16 from the material which is to be filtered. A pipe 17 is situated in the lower portion of the trough 15 to provide egress for the filtrate. Beyond the roller 4, suitable removing means such as a scraper knife 18 engage the surface of the belt to remove filtered material from the belt. Between stretching rolls 7, 8 and 9, 10, respectively, washing means such as a spray device 19 are provided with washing fluid 20 by means of a feed pipe 21 from a source not shown. The cleaning means 19 may conveniently be placed above the belt between the stretch rolls 7 and 9, and may cooperate with a waste receptacle 22 placed below the belt and between the stretch rolls 8 and 10.

In operation, the material 14 to be filtered is deposited onto the moving belt 1 and filtrate 16 is withdrawn through the belt by gravity, pressure, or otherwise, as desired, into the trough 15. If desired, guides or other means (not shown) may be associated with the edges of the upper surface of the filter medium to prevent the material to be filtered from running off the belt. The travel of the belt in the direction of the arrow brings the filtered material 14, with at least part of the filtrate 16 removed, into contact with the scraper knife 18 so that the major portion of filtered material and filtrate is removed before the belt passes between the nip rolls 5 and 6. After removal of the major portion of material from the belt, a considerable quantity of finely divided material, together with some entrained slurry, still adheres to the surface of the belt, and is particularly caught within the perforations 2 of the belt. Since the surface speeds of the stretch rolls 7 and 8 are greater than those of the nip rolls 5 and 6, the portion of the extensible belt 1 travelling between the nip rolls 5 and 6 and the stretch rolls 7 and 8, respectively, is elongated. Fig. 3 illustrates a portion of the belt as it travels between the nip rolls and the stretch rolls. The longitudinal stretch imparted to the belt results in changing each circular perforation of given diameter to an elliptical shape having both axes greater than the original diameter. For example, when a sheet having circular perforations of .010 inch on the average is stretched 100% longitudinally, the major axes of the perforations then average about .033 inch and the minor axes average approximately .015 inch, these relative proportions being indicated by a comparison of Figs. 2 and 3 of the drawing. During longitudinal stretch, the overall lateral contraction of the elongated portion of the rubber sheet is not appreciable, since substantially all of the stretching takes place, as shown in Fig. 3, in the portions of the belt laterally separating the perforations; and very little lateral contraction, at 100% overall stretch, occurs in the rubber longitudinally separating the rows of holes. The effect of independently stretching the belt and materially enlarging the perforations 2 is to loosen material stuck on the surface thereof and caught within the perforations. The degree of stretch accomplished by the stretch rolls 7 and 8 may be adjusted as desired by increasing the speeds of the rolls 7 and 8 relative to the rolls 5 and 6 within the elastic limits of the belt 1.

The stretch imparted by the stretch rolls 7 and 8 is retained by the stretch rolls 9 and 10 which have the same surface speed as the rolls 7 and 8, in order to maintain the enlarged perforations during the cleaning operation. The portion of the belt thus stretched between the rolls 7, 8 and 9, 10, respectively, may be conveniently cleaned or washed by passing the washing fluid 20 from the washing device 19 through the perforations 2 in the belt 1 to rid the surface of the belt and the perforations or pores of foreign entrained material. The washed liquor carrying the foreign particles and filtrate is caught by the waste receptacle 22. The cleaning step may, if desired, be carried out on the stretched belt in other ways, as by passing the stretched belt through a circulating bath, or by blowing or forcing fluid under pressure, such as compressed air, through the perforations in the belt, or by means of revolving brushes or beaters placed above or below the stretched portion of the belt. As a portion of the belt which has just been cleaned continues in the cycle between the second pair of stretch rolls 9 and 10 and the nip rolls 11 and 12, it is relaxed to the desired degree since the surface speed of the nip rolls is less than the surface speed of the stretch rolls. Since the nip rolls 11 and 12 travel at the same speed as the driving roll 3, the portion of the belt therebetween may again be in its relaxed state as shown in Fig. 2. That portion of the belt is then ready to repeat the cycle of filtering and cleaning. The "relaxing" of the stretched belt as described herein does not necessarily refer to a complete relaxation of the rubber, but designates a release of tension to the desired degree imparted to the belt during its course of travel from the nip roll 11 around to the nip roll 5. If desired, the stretching and relaxing may be accomplished in a series of progressive steps by the employment of a series of pairs of stretching or relaxing rolls having progressively increasing or decreasing surface speed. It is preferable that the mechanically stretched portions of the belt be stretched in planar, rather than angular or curved, direction. With this type of stretching, the degree of enlargement of all the perforations remains substantially the same, and parallel streams of fluid, such as the fluid 20 illustrated in Fig. 1, are all presented to the stretched filtering medium in the same direction and may therefore exert a constant pressure thereagainst to provide uniform cleaning.

If desired, transverse or lateral stretching may be accomplished by one or more conventional tentering devices engaging each edge of the filtering member. It is obvious that such transverse stretching mechanism will be employed in association with the cleaning means to enlarge the pores as the belt 1 is stretched. With some types of finely divided material, it may be particularly advantageous to substitute a tentering device for the nip rolls and stretch rolls above described in order to eliminate the pressure imparted by the latter. For example, if some large hard particles left on and in the belt after removal of the major portion of filtered material therefrom are conveyed between pressure rolls, they may have a tendency to become wedged in the belt and render removal therefrom extremely difficult. In the case of other materials, it may be desirable simultaneously to stretch the belt both longitudinally and transversely, in order to enlarge the perforations therein to an even greater degree. This obviously may be accomplished in any desired manner as by employing a pair of tentering mechanisms between the stretch rolls 7, 8 and 9, 10.

Other embodiments of the invention may be carried out in desired manner. For example, the apparatus may be employed as a clarifier for liquids. For such use, the perforate belt may be covered with an outer surface coating of finely divided material. To this end a slurry of celite, diatomaceous earth, asbestos fibres, paper pulp or the like may be deposited onto the belt and the liquid of the slurry may be withdrawn through the belt into a suction box, leaving a coating of the finely divided solid material on the surface of the belt. The liquid to be clarified may then be flowed onto the surface coating and withdrawn therethrough and through the belt into a separate suction box, whence it is recovered in clarified condition.

The terms "mechanical stretch", or "mechanically stretching" the material, as used herein refer to elongation by the exertion of mechanical forces, as by exerting tension in the plane of the material, and as opposed to mere expansion by exerting fluid pressure against the surface of the material in a direction transverse to the plane of the material. The term "rubber" as used herein refers broadly to natural or artificial rubber or rubber-like materials. While certain present preferred embodiments of the invention have been shown and described, it is to be understood that the invention may be otherwise practiced within the spirit thereof and within the scope of the appended claims.

Having thus described my invention, what I claim and desire to protect by Letters Patent is:

1. A method of filtering solid material suspended in a liquid which comprises advancing an elastic perforate filtering member, depositing solid material suspended in a liquid on successive portions of the surface of the filtering member as it travels and withdrawing liquid through the perforations therein, removing filtered solid material from the advancing portions of said surface after deposition thereon, mechanically stretching said advancing portions and cleaning said portions while in stretched condition after removal of the solid material therefrom, and relaxing said cleaned advancing portions.

2. In a filtration method, the steps comprising mechanically stretching successive portions of a travelling perforate elastic filtering member and passing fluid through said travelling portions while mechanically stretched to clean the same.

3. A method of filtering solid material suspended in a liquid which comprises advancing an elastic perforate filtering member, depositing solid material suspended in a liquid on successive portions of the surface of the filtering member as it travels and withdrawing liquid through the perforations therein, removing filtered solid material from the advancing portions of said surface after deposition thereon, mechanically stretching said advancing portions and passing fluid through said advancing portions to clean the same while in stretched condition, and relaxing said cleaned advancing portions.

4. Filtering apparatus comprising a travelling perforate elastic filtering surface, means associated with said filtering surface for withdrawing a filtrate through successive portions of said travelling surface, means for removing filtered material from said successive portions of the surface, means for mechanically stretching and cleaning while stretched said successive portions of the surface, and means for relaxing said portions of the travelling surface.

5. Filtering apparatus comprising a travelling perforate elastic filtering surface, means associated with said filtering surface for withdrawing a filtrate through successive portions of said travelling surface, means for removing filtered material from said successive portions of the surface, means for mechanically stretching said successive portions of the travelling surface and for passing fluid through said successive portions while stretched to clean the same, and means for relaxing said advancing portions of the travelling surface.

HUBERT F. JORDAN.